United States Patent
Yoshida et al.

[11] Patent Number: 6,082,636
[45] Date of Patent: Jul. 4, 2000

[54] WINDOW WASHER NOZZLE ASSEMBLY HAVING A FAVORABLE SPRAY PATTERN

[75] Inventors: Yasuhiko Yoshida; Akira Takayama, both of Wako; Koji Iwazaki, Saitama-ken; Takatoshi Kondo, Gunma-ken, all of Japan

[73] Assignees: Honda Giken Kogyo Kabushiki Kaisha, Tokyo; Mitsuba Corporation, Gunma-ken, both of Japan

[21] Appl. No.: 09/369,403

[22] Filed: Aug. 5, 1999

[30] Foreign Application Priority Data

Aug. 6, 1998  [JP]  Japan .................................. 10-222500

[51] Int. Cl.[7] .................................................... B05B 1/10

[52] U.S. Cl. .................... 239/284.1; 239/589; 15/250.01

[58] Field of Search .............................. 239/284.1, 284.2, 239/499, 504, 518, 589, 589.1, 590, 597, 601; 15/250.01, 250.02

[56] References Cited

U.S. PATENT DOCUMENTS

| | | | |
|---|---|---|---|
| 3,008,649 | 11/1961 | Bock et al. | 239/284.1 |
| 3,173,613 | 3/1965 | Smith | 239/284.1 |
| 5,975,431 | 11/1999 | Harita et al. | 239/284.1 |

FOREIGN PATENT DOCUMENTS 515657  2/1955  Italy ..................................... 239/284.1

*Primary Examiner*—Andres Kashnikow
*Assistant Examiner*—Lisa Ann Douglas
*Attorney, Agent, or Firm*—Skjerven Morrill MacPherson Franklin & Friel LLP; Alan H. MacPherson

[57] ABSTRACT

In a washer nozzle assembly, the upper lip portion defining a nozzle opening extends more forwardly than the lower lip portion so that the part of the washer liquid directed upward is blocked by the longer upper lip portion, and the upper part of the spray pattern includes more liquid droplets of larger sizes as compared to the prior art. Thus, the loss of washer liquid by being flown above the windshield at high speed can be reduced, and the spray pattern of the washer nozzle assembly can be optimized for all speeds.

4 Claims, 3 Drawing Sheets

WINDOW WASHER NOZZLE ASSEMBLY HAVING A FAVORABLE SPRAY PATTERN

TECHNICAL FIELD

The present invention relates to a window washer nozzle assembly for spraying window washer liquid onto a front windshield of a motor vehicle, and in particular to a window washer nozzle assembly demonstrating a favorable spray pattern.

BACKGROUND OF THE INVENTION

Motor vehicles are commonly equipped with a window washer for spraying washer liquid onto the windshield for clearing the view of the windshield in cooperation with a windshield wiper. Typically, operation of a window washer is accompanied by the activation of a windshield wiper. For optimum utilization of the washer liquid of a limited supply, it is desirable to optimize the spray pattern of the washer liquid. There are two types of spray patterns. The first type consists of a linear spray pattern which permits a jet of washer liquid having a circular cross section to impinge upon a narrow region on the windshield. The second type consists of a sheet spray pattern which allows the washer liquid to impinge upon a wider region on the windshield.

It is known that the latter provides a superior window clearing performance over the former for a given consumption of the washer liquid and a given number of cycles of wiper operation. When the washer liquid is sprayed with a certain spread, the size of the water droplets in the central part of the washer liquid spray is typically larger than those in the peripheral part. Therefore, when the nozzles for the window washer are aimed to the central part of the windshield, the droplets of the washer liquids evenly land on the windshield when the vehicle is stationary. However, when the vehicle is traveling at high speed, a high speed air flow is produced along the surface of the windshield, and the small droplets of the washer liquid tend to be blown away without landing on the windshield. Therefore, according to such a conventional arrangement, a significant part of the washer liquid is flown above the windshield when the vehicle is traveling at high speed, and is hence wasted.

It is conceivable to lower the aim of the washer nozzles. It may improve the situation when the vehicle is traveling at high speed, but the washer liquid will land preferentially in the lower part of the windshield when the vehicle is either stationary or traveling at low speed. A significant part of the washer liquid may even hit below the lower edge of the windshield. Therefore, there has been a problem that the spray pattern of window washer nozzles cannot be optimized for all speed ranges of the vehicle.

BRIEF SUMMARY OF THE INVENTION

In view of such problems of the prior art, a primary object of the present invention is to provide a window washer nozzle assembly which can optimize the spray pattern at all traveling speeds of the vehicle.

A second object of the present invention is to provide a window washer nozzle assembly which can optimize the spray pattern by using a simple arrangement without increasing the cost.

According to the present invention, such objects can be accomplished by providing a window washer nozzle assembly, comprising: a nozzle tip member including a main part having a passage defined therein, a laterally elongated opening formed in the main part and communicating with the passage, and upper and lower lip portions extending forwardly away from parts of the main part immediately above and below the opening, respectively; and a nozzle holder supporting the nozzle tip on a vehicle body part; wherein the upper lip portion extends relatively more forwardly than the lower lip portion.

Because the upper lip portion is longer than the lower lip portion, the part of the washer liquid directed upward is blocked by the longer upper lip portion In particular, the upper part of the spray pattern which is blocked by the upper lip portion consists primarily of small droplets of the washer liquid. Therefore, the upper part of the spray pattern according to the present invention includes more liquid droplets of larger sizes which are less affected by an air flow along the surface of the windshield as compared to the prior art. According to the present invention, the spray nozzles are aimed in proper directions so as to substantially cover the surface of the windshield when the vehicle is stationary or running at low speed. When the vehicle runs at high speed, the upper part of the spray pattern as well as the central part thereof is not significantly affected by high speed air flows as it mostly consists of liquid droplets of large sizes, and the washer liquid spray can therefore cover a wide surface area. In other words, the part of the liquid spray that is blown above the windshield when the vehicle is running at high speed is reduced as compared to the prior art.

A compact design of such a window washer nozzle assembly is possible when the main part is substantially spherical in shape, and the upper and lower lip portions are defined by a cylindrical portion which integrally and radially extends from the spherical main part and is provided with a laterally elongated slot communicating with the opening. In this case, the nozzle holder may comprise a recess for complementarily receiving the spherical main body so as to allow the spherical main part to pivot around a center thereof, and the aim of the washer liquid nozzle may be adjusted at will. Also, the passage for communicating a source of washer liquid with the nozzle end can be both economically and compactly constructed if the passage is passed diametrically across the spherical main part, and communicates with the opening at an end of the passage.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
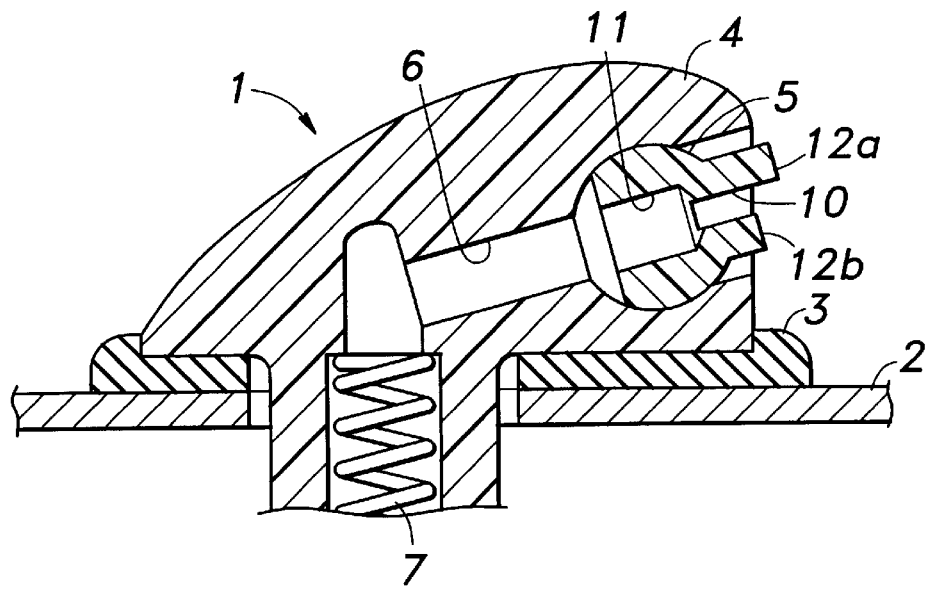
FIG. 1 is a vertical sectional view of the washer nozzle assembly embodying the present invention.
Figure 2:
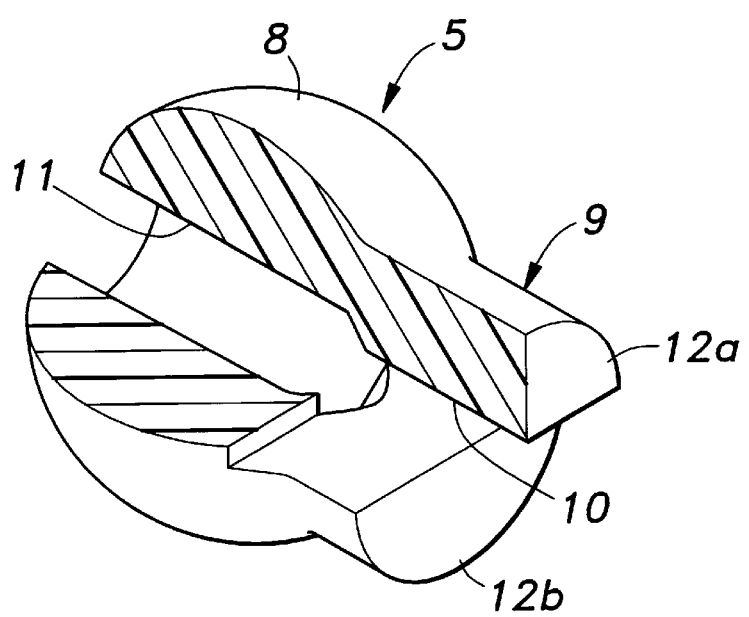
FIG. 2 is a perspective view of the nozzle tip member partly in section.

FIG. 1 is a vertical sectional view of a washer nozzle assembly embodying the present invention, and FIG. 2 is a perspective view of the nozzle tip member partly in section. This nozzle assembly 1 comprises a nozzle holder 4 which is attached to a suitable location on an engine hood 2 via a seal plate 3, and a nozzle tip member 5 which is pivotally received in the nozzle holder 4 in the manner of a ball and socket joint. The nozzle tip member 5 is normally securely received in the nozzle holder 4, but can be adjusted by turning it inside the nozzle holder 4 by using a suitable tool. The nozzle tip member 5 is installed with a proper aim during the assembly process, and normally kept fixed in this state during its entire service life, but can be adjusted as a part of servicing if such a need arises. Normally, a pair of such nozzle assemblies are used in a laterally spaced relationship so as to cover the entire surface of the windshield. The nozzle holder 4 is provided with a washer liquid passage 6, a one-way valve (not shown in the drawings), and a compression coil spring 7 for urging the one-way valve in the closing direction. However, such an arrangement is per se known, and is not described here.

The nozzle tip member 5 consists of a spherical main part 8 and a cylindrical portion 9 integrally extending therefrom. The cylindrical portion 9 is provided with a laterally elongated slot 10 extending centrally through the entire length of the cylindrical portion 9. The spherical main part 8 is provided with a passage 11 having a circular cross section which is passed entirely and diametrically through the spherical main part 8 on a common central axial line as the cylindrical portion 9. The passage 11 and the slot 10 thus communicate with each other at a junction between the spherical main part 8 and the cylindrical portion 9. When washer liquid under pressure is introduced into the passage 11 by a pump not shown in the drawing, it is sprayed from the slot 10 as a laterally extending sheet of washer liquid.

The cylindrical portion 9 is separated into upper and lower lip portions 12a and 12b by the slot 10, and the upper lip portion 12a axially extends more forwardly than the lower lip portion 12b. The forward ends of the upper and lower lip portions 12a and 12b are defined by flat surfaces which are both 10 perpendicular to the axial line of the cylindrical portion 9, but are axially offset relative to each other. More specifically, the upper lip portion 12a has a larger axial length than the lower lip portion 12b.

Figure 3A:
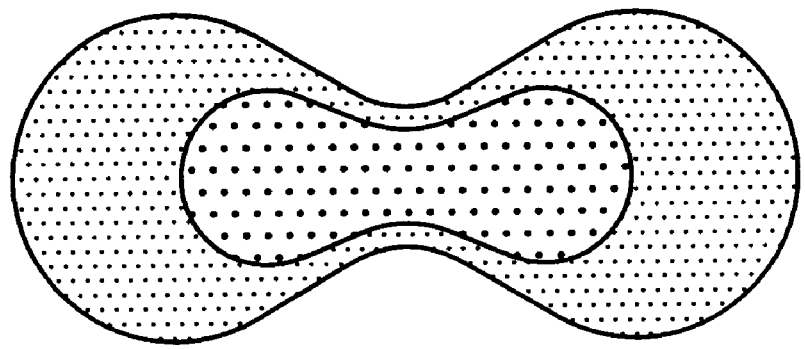
FIGS. 3a and 3b are schematic views showing spray patters according to the prior art and the present invention, respectively.

Now the mode of operation of this embodiment is described in the following. FIG. 3a shows a pattern of a washer liquid spray from a conventional nozzle consisting of a laterally elongated slot having upper and lower lips having a same axial length. The pattern is symmetric with respect to both a vertical central line and a horizontal central line. The pattern includes a central region consisting of liquid droplets of relatively large sizes and a peripheral region consisting of liquid droplets of relatively small sizes.

Figure 3B:
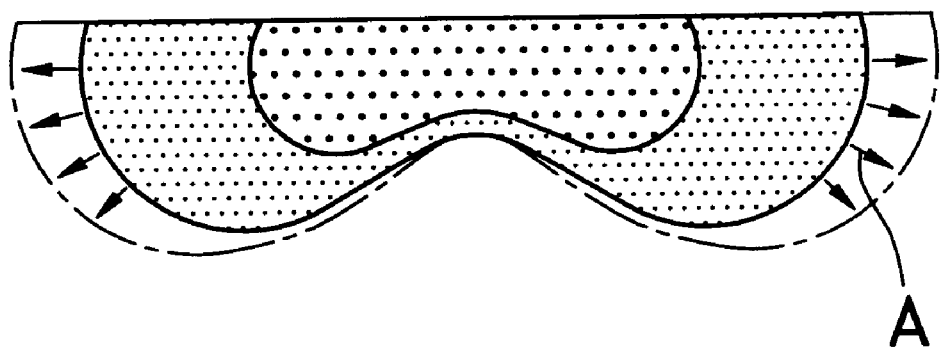

According to the present invention, because the upper lip portion 12a of the cylindrical portion 9 extends longer than the lower lip portion 12b thereof in the direction of spraying the washer liquid, the spray pattern becomes asymmetric with respect to the horizontal center line as illustrated in FIG. 3b. Specifically, the part of the washer liquid directed upward is blocked by the longer upper lip portion 12a, and the upper part of the spray pattern includes more liquid droplets of larger sizes as compared to the conventional spray pattern illustrated in FIG. 3a. The spray nozzles are aimed in proper directions so as to substantially cover the surface of the windshield when the vehicle is stationary or running at low speed. When the vehicle runs at high speed, the central part of the spray pattern is not significantly affected by high speed air flows as it mostly consists of liquid droplets of large sizes, and the washer liquid spray can cover a wide surface area. Also, the part of the liquid spray that is blown above the windshield when the vehicle is running at high speed is reduced as compared to the prior art.

Also, the part of the washer liquid on each laterally peripheral part of the pray patter is affected by air flows when the vehicle is traveling at high speed, but is primarily blown mostly sideways as indicated by the arrows A in FIG. 3a. Therefore, it gives the greater lateral expanse for the spray pattern, and it is advantageous in view of clearing the view with the wiper blades in a short period of time.

Figure 4:
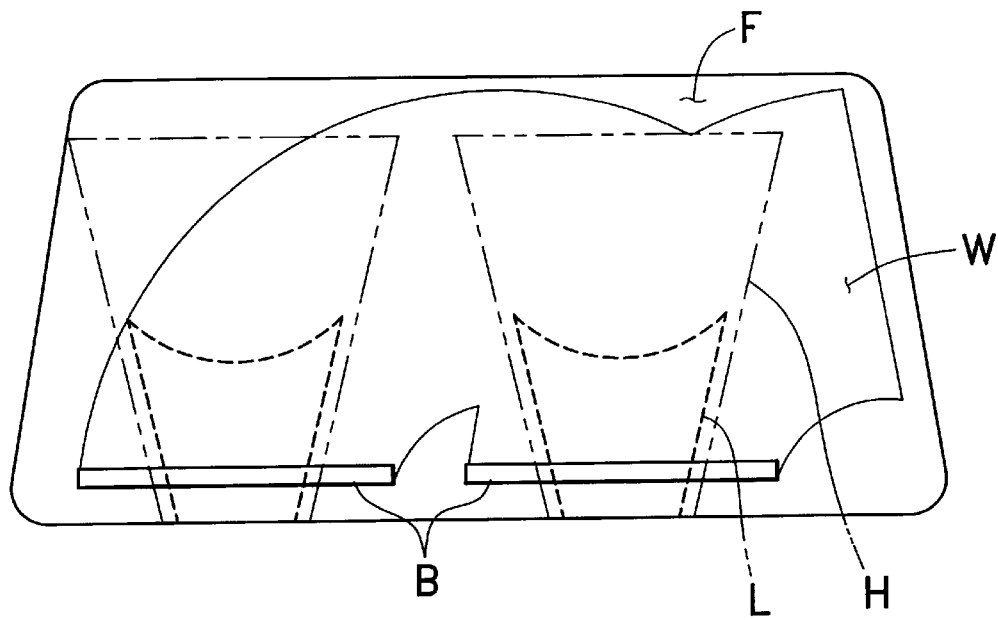
FIG. 4 is a diagrammatic view comparing spray patterns of the present invention when the vehicle is stationary and running at high speed.
Figure 5:
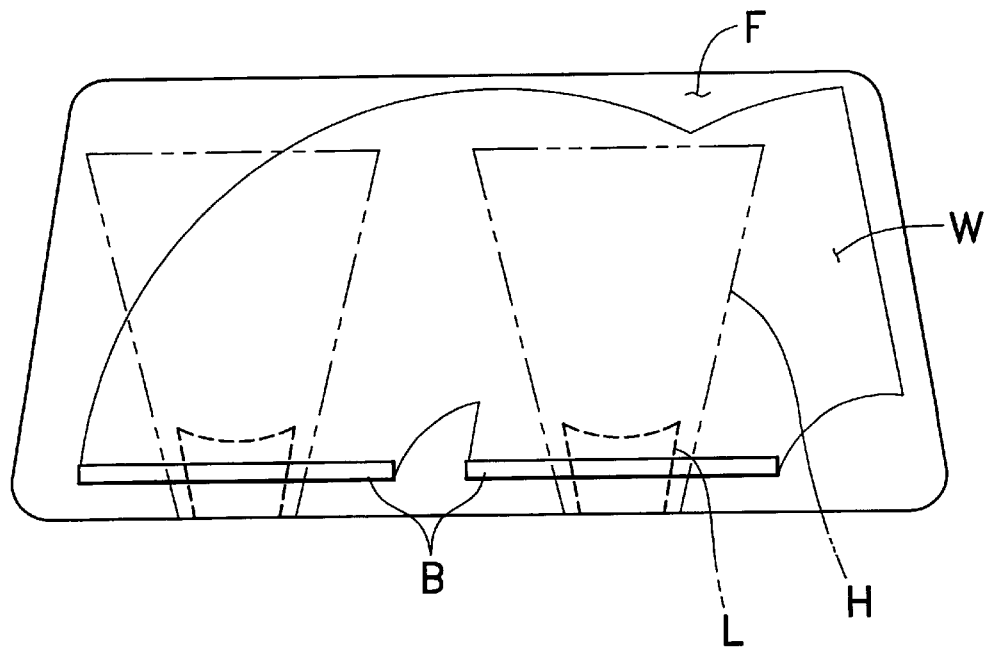
FIG. 5 is a view similar to FIG. 4 comparing spray patterns of the prior art.

FIGS. 4 and 5 compare the spray patterns of the present invention and the prior art. In these drawings, B denotes the wiper blade, and W denotes the surface area covered by the wiper blade while F denotes the surface area not covered by the wiper blade. According to the prior art, when the spray pattern is selected so as to be optimum at high speed as indicated by the two-dot chain dot lines H in FIG. 5, the spray pattern at low speed will be as indicated by the broken lines L. More specifically, according to the prior art, the spray pattern at high speed is strongly affected by the high speed air flow along the windshield. Therefore, the spray pattern at low speed is concentrated in the lower part of the windshield because of the absence of air flow which would carry the liquid droplets to higher parts of the windshield. On the other hand, according to the present invention, when the spray pattern is optimized for high speed as indicated by the two-dot chain dot lines H in FIG. 4, because the liquid droplets which land on higher parts of the windshield mainly consist of relatively large liquid droplets, they are not much affected by air flows along the windshield. Therefore, even when the spray pattern is optimized for high speed, the liquid droplets can reach relatively high parts of the windshield also when the vehicle is either stationary or travelling at low speed as indicated by the broken lines L in FIG. 4.

Although the present invention has been described in terms of preferred embodiments thereof, it is obvious to a person skilled in the art that various alterations and modifications are possible without departing from the scope of the present invention which is set forth in the appended claims.

What is claimed is:

1. A window washer nozzle assembly, comprising:

a nozzle tip member including a main part having a passage defined therein, a laterally elongated opening formed in said main part and communicating with said passage, and upper and lower lip portions extending forwardly away from parts of said main part immediately above and below said opening, respectively; and a nozzle holder supporting said nozzle tip on a vehicle body part;

wherein said upper lip portion extends relatively more forwardly than said lower lip portion.

2. A window washer nozzle assembly according to claim 1, wherein said main part is substantially spherical in shape, and said upper and lower lip portions are defined by a cylindrical portion which integrally and radially extends from said spherical main part and is provided with a laterally elongated slot communicating with said opening.

3. A window washer nozzle assembly according to claim 2, wherein said nozzle holder comprises a recess for complementarily receiving said spherical main body so as to allow said spherical main part to pivot around a center thereof.

4. A window washer nozzle assembly according to claim 2, wherein said passage is passed diametrically across said spherical main part, and communicates with said opening at an end of said passage.

* * * * *